United States Patent
Natsume et al.

(10) Patent No.: US 8,266,920 B2
(45) Date of Patent: Sep. 18, 2012

(54) REFRIGERANT CYCLE AND METHOD OF CONTROLLING THE SAME

(75) Inventors: Morikuni Natsume, Osaka (JP); Hiroshi Doumae, Osaka (JP); Satoshi Yagi, Osaka (JP); Yasuaki Miyaba, Osaka (JP); Hisashi Sumida, Osaka (JP)

(73) Assignee: Daikin Industries, Ltd., Osaka (JP)

(*) Notice: Subject to any disclaimer, the term of this patent is extended or adjusted under 35 U.S.C. 154(b) by 663 days.

(21) Appl. No.: 12/527,828

(22) PCT Filed: Feb. 19, 2008

(86) PCT No.: PCT/JP2008/052746
§ 371 (c)(1),
(2), (4) Date: Aug. 19, 2009

(87) PCT Pub. No.: WO2008/102766
PCT Pub. Date: Aug. 28, 2008

(65) Prior Publication Data
US 2010/0036532 A1  Feb. 11, 2010

(30) Foreign Application Priority Data
Feb. 20, 2007  (JP) .................... 2007-038818

(51) Int. Cl.
*F25B 49/00* (2006.01)
*F25D 19/00* (2006.01)

(52) U.S. Cl. .......................... 62/222; 62/296
(58) Field of Classification Search ............ 62/157, 62/222, 223, 231, 296
See application file for complete search history.

(56) References Cited

U.S. PATENT DOCUMENTS

| | | | | |
|---|---|---|---|---|
| 4,873,836 | A | * | 10/1989 | Thompson ............. 62/158 |
| 5,950,439 | A | * | 9/1999 | Peterson et al. ........ 62/80 |
| 8,020,394 | B2 | * | 9/2011 | Hong et al. ............ 62/222 |

FOREIGN PATENT DOCUMENTS

| | | |
|---|---|---|
| JP | 9-133434 A | 5/1997 |
| JP | 10-300291 A | 11/1998 |
| JP | 2002-267279 A | 9/2002 |

* cited by examiner

*Primary Examiner* — Marc Norman
(74) *Attorney, Agent, or Firm* — Birch, Stewart, Kolasch & Birch, LLP

(57) ABSTRACT

An object of the present invention is to reduce electrical noise in accordance with the necessity of a countermeasure taken against electrical noise without changing a structure of an expansion valve. In a case where a judgment result as to whether or not the countermeasure against electrical noise is taken is affirmative, a drive timing (interval) of an expansion valve (107) is increased. Further, a driving amount is reduced. Accordingly, a flow of a refrigerant is made slow, whereby it is possible to reduce generated electrical noise while performing instructed temperature control.

6 Claims, 3 Drawing Sheets

REFRIGERANT CYCLE AND METHOD OF CONTROLLING THE SAME

TECHNICAL FIELD

The present invention relates to a refrigerant cycle and a method of controlling the same.

BACKGROUND ART

When a refrigerant cycle is driven, it is required to satisfy standards by reducing generated noise, in particular, electrical noise. For instance, in Japan, the standards are described in the provision in Section 2 of the ministerial ordinance of Electrical Appliances and Material Safety Law, more specifically, there are so-called IEC-J standards J55001 (Standard for Noise Intensity), J55014-1 (Electromagnetic Compatibility-Requirement for Household Appliances, Electric Tools and Similar Apparatus), and J55022 (Information from Technology Equipment-Radio Disturbance Characteristics-Limits and Methods of Measurement). In Europe, there are EN55014-1 (Electromagnetic Compatibility.—Requirements for Household Appliances, electric tools and similar apparatus. Emission) and EN55022 (Information Technology Equipment.—Radio Disturbance Characteristics.—Limits and methods of measurement). Those standards do not need to be satisfied all the time, and it is sufficient only to reduce electrical noise under conditions set in advance. That is, the refrigerant cycle is required to perform an operation for satisfying the standards in a case where the standards need to be satisfied, and perform another operation in a case where the standards do not need to be satisfied.

In order to reduce the generation of electrical noise, it is conceivable to, for example, change a structure of an expansion valve.

Note that Patent Document 1 describes a technique of changing a structure of an expansion valve to reduce cavitation noise.

Patent Document 1: Japanese Patent Application Laid-Open No. 09-133434

DISCLOSURE OF INVENTION

Problems to be Solved by the Invention

However, a change in structure of the expansion valve leads to a rise in cost. In addition, it is cumbersome to change the structure of the expansion valve in accordance with the need as to whether the standards are satisfied.

Therefore, in order to reduce the generation of electrical noise without changing the structure, it is also conceivable to reduce a rotation speed of a compressor or reduce a rotation speed of a fan of a heat exchanger. For such control, an operation of an inverter circuit which drives the compressor and the fan is directly controlled.

However, according to the standards on electrical noise, it is required to reduce electrical noise under a predetermined temperature control condition. Accordingly, it is difficult to satisfy the above-mentioned standards by reducing the rotation speed of the compressor or the fan.

It is therefore an object of the present invention to reduce electrical noise, under a temperature controlled condition, in accordance with the necessity of taking countermeasure against electrical noise without changing a structure of an expansion valve.

Means to Solve the Problems

A first aspect of the method of controlling a refrigerant cycle of the present invention relates to a method of controlling a refrigerant cycle which includes: a compressor (101), a condenser (103), an expansion valve (107), and an evaporator (202) through which a refrigerant (LG, HG, HL, LL, LG) circulates in the stated order; and a control section (106) which controls, based on a first instruction (C) for setting temperature control, at least an operation of the compressor, and an interval (T) and a driving amount (J) for driving the expansion valve. The method executes the steps of: (a) obtaining a second instruction (Q) for setting whether or not a countermeasure against electrical noise is taken (S12); (b) adopting, in a case where the second instruction indicates that the countermeasure against electrical noise is not taken, a first value (D1) as the interval based on the first instruction (S13); (c) adopting, in a case where the second instruction indicates that the countermeasure against electrical noise is taken, a second value (D2) larger than the first value as the interval (S14); and (d) transmitting, after the steps (b) and (c) are performed, the driving amount to the expansion valve at the interval (S19).

According to a second aspect of the method of controlling a refrigerant cycle of the present invention, in the first aspect, the control section (106) generates an instruction amount (E) serving as a target value of the driving amount (J), and the method further executes, between the step (a) and the step (d), the steps of: (e) judging, in a case where the second instruction indicates that the countermeasure against electrical noise is taken, whether or not the instruction amount exceeds a predetermined value (P) (S15); (f) adopting, in a case where the judgment of the step (e) is negative, the instruction amount as the driving amount (S16); and (g) adopting, in a case where the judgment of the step (e) is affirmative, a value smaller than the instruction amount as the driving amount (S17). In the step (d) executed are: (d-1) adopting, in the case where the second instruction indicates that the countermeasure against electrical noise is not taken, the instruction amount as the driving amount (S16) and transmitting the driving amount to the expansion valve (S19); and (d-2) transmitting, in the case where the second instruction indicates that the countermeasure against electrical noise is taken, the driving amount adopted in any one of the steps (f) and (g) to the expansion valve (S19).

According to a third aspect of the method of controlling a refrigerant cycle of the present invention, in the second aspect, the method further executes the step of (h) subtracting the driving amount adopted in the step (g) from the indication value and updating the indication value, the step (h) (S18) being accompanied with the step (g), wherein the steps (a) to (h) are performed again.

According to a first aspect of a refrigerant cycle of the present invention, the refrigerant cycle includes: a compressor (101), a condenser (103), an expansion valve (107), and an evaporator (202) through which a refrigerant (LG, HG, HL, LL, LG) circulates in the stated order; a control signal generating section (106f) which generates, based on a first instruction (C) for setting temperature control, a control signal (M) for controlling an operation of the compressor; an interval generating section (106b) which receives a second instruction (Q) indicating whether or not a countermeasure against electrical noise is taken, (i) sets an interval for driving the expansion valve as a first value (D1) based on the first instruction in a case where the second instruction indicates that the countermeasure against electrical noise is not taken, and (ii) sets the interval as a second value (D2) larger than the first value in a case where the second instruction indicates that the countermeasure against electrical noise is taken; and an output section (106d) which transmits, based on the interval, a driving amount (J) for driving the expansion valve based on the first instruction, to the expansion valve.

According to a second aspect of the refrigerant cycle of the present invention, in the first aspect, the refrigerant cycle further includes: a driving instruction amount generating section (106a) which generates, based on the first instruction, an instruction amount (E) serving as a target value of the driving amount (I); and a driving amount generating section (106c) which receives the instruction amount (E) and the second instruction (Q), (I) adopts the instruction amount as the driving amount (J) and transmits the driving amount to the output section (106d) in the case where the second instruction indicates that the countermeasure and in a case where the instruction amount does not exceed a predetermined value (P), and (II) adopts a value smaller than the instruction amount as the driving amount and transmits it the driving amount to the output section (106d) in the case where the second instruction indicates that the countermeasure against electrical noise is taken and in a case where the instruction amount exceeds the predetermined value.

According to a third aspect of the refrigerant cycle of the present invention, in the second aspect, the driving amount generating section (106c) (III) adopts the instruction amount as the driving amount (J) and transmits the driving amount to the output section (106d) in the case where the second instruction indicates that the countermeasure against electrical noise is not taken.

EFFECT OF THE INVENTION

According to any of the first aspects of the refrigerant cycle and the method of controlling the same of the present invention, the interval for driving the expansion valve is increased when the countermeasure against electrical noise is taken. Accordingly, the flow of the refrigerant is made slow, whereby it is possible to reduce the generated electrical noise while performing the temperature control based on the first instruction.

According to any of the second aspects of the refrigerant cycle and the method of controlling the same of the present invention, the driving amount for driving the expansion valve is reduced when the countermeasure against electrical noise is taken. Accordingly, the flow of the refrigerant is made slow, whereby it is possible to reduce the generated electrical noise while performing the temperature control based on the first instruction.

According to any of the third aspects of the refrigerant cycle and the method of controlling the same of the present invention, the driving amount reduced in the second aspects is compensated.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
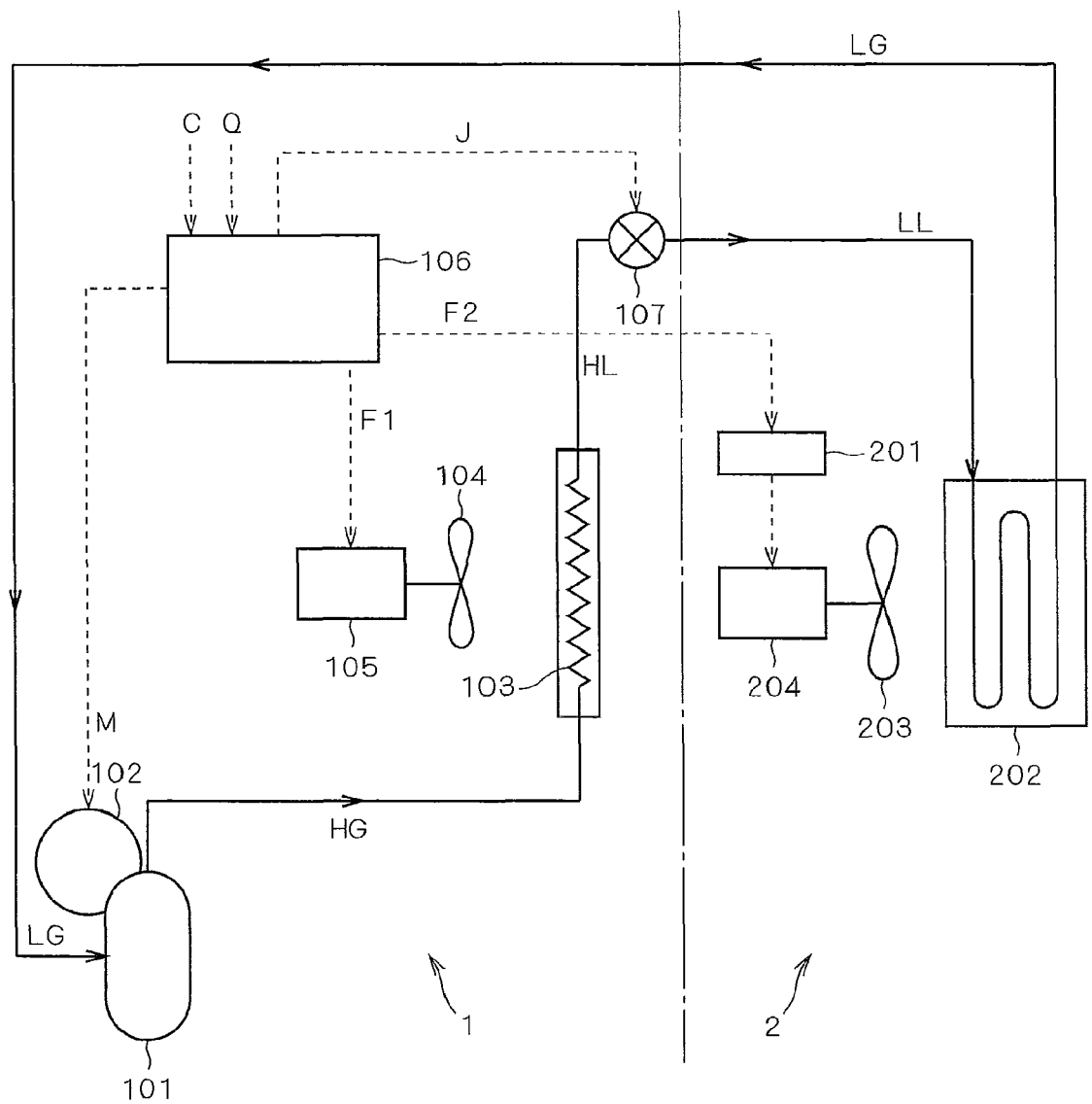
FIG. 1 is a block diagram showing a refrigerant cycle according to the present invention.

FIG. 1 is a block diagram showing a refrigerant cycle according to the present invention. The refrigerant cycle is realized by an air conditioner, and the air conditioner includes an outdoor unit 1 and an indoor unit 2.

In the refrigerant cycle, a refrigerant circulates through a compressor 101, a condenser 103, an expansion valve 107, and an evaporator 202 in the stated order. Specifically, a low-pressure gaseous refrigerant LG is compressed by the compressor 101 to become a high-pressure gaseous refrigerant HG, the gaseous refrigerant HG is condensed by the condenser 103 to become a high-pressure liquid refrigerant HL, the liquid refrigerant HL is expanded by the expansion valve 107 to become a low-pressure liquid refrigerant LL, and the liquid refrigerant LL is evaporated by the evaporator 202 to become a gaseous refrigerant LG.

The compressor 101 is driven by a motor 102. Air is send to the condenser 103 by a fan, and the fan 104 is driven by a motor 105. Air is send to the evaporator 202 by a fan 203, and the fan 203 is driven by a motor 204.

The outdoor unit 1 includes the compressor 101, the motor 102, the condenser 103, the fan 104, the motor 105, a control section 106, and the expansion valve 107. The indoor unit 2 includes a control section 201, the evaporator 202, the fan 203, and the motor 204.

The control section 106 outputs, based on a first instruction C from outside for setting temperature control, control signals M, F1, and F2 for controlling rotation of the motor 102, 105, and 204, respectively. In addition, the control section 106 outputs a driving pulse J for controlling a driving amount of the expansion valve 107 at intervals described below. The driving pulse J and its output intervals are adopted based on a second instruction Q for externally setting whether or not a countermeasure against electrical noise is taken.

Figure 2:
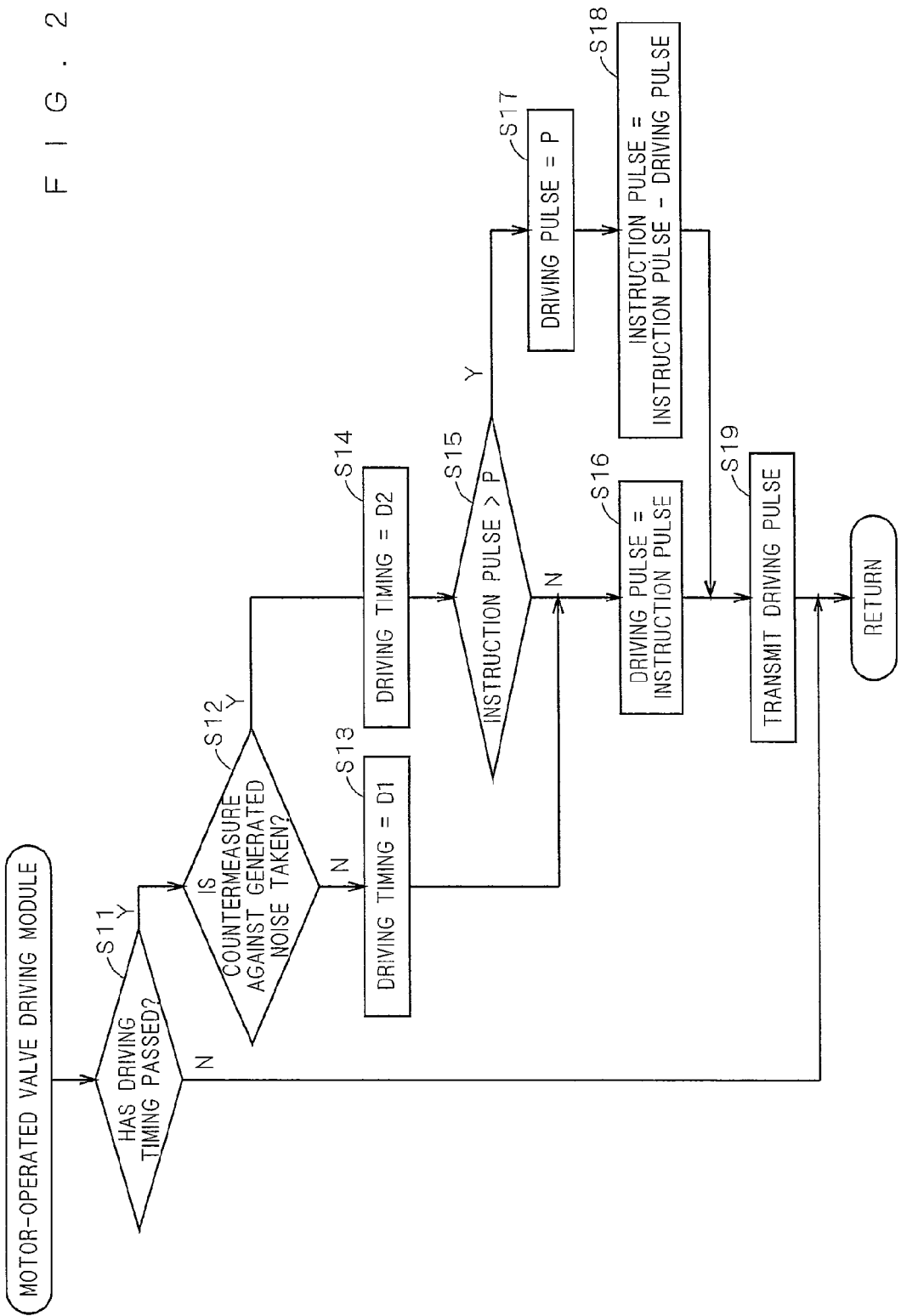
FIG. 2 is a flowchart illustrating a method of controlling the refrigerant cycle according to the present invention.
Figure 3:
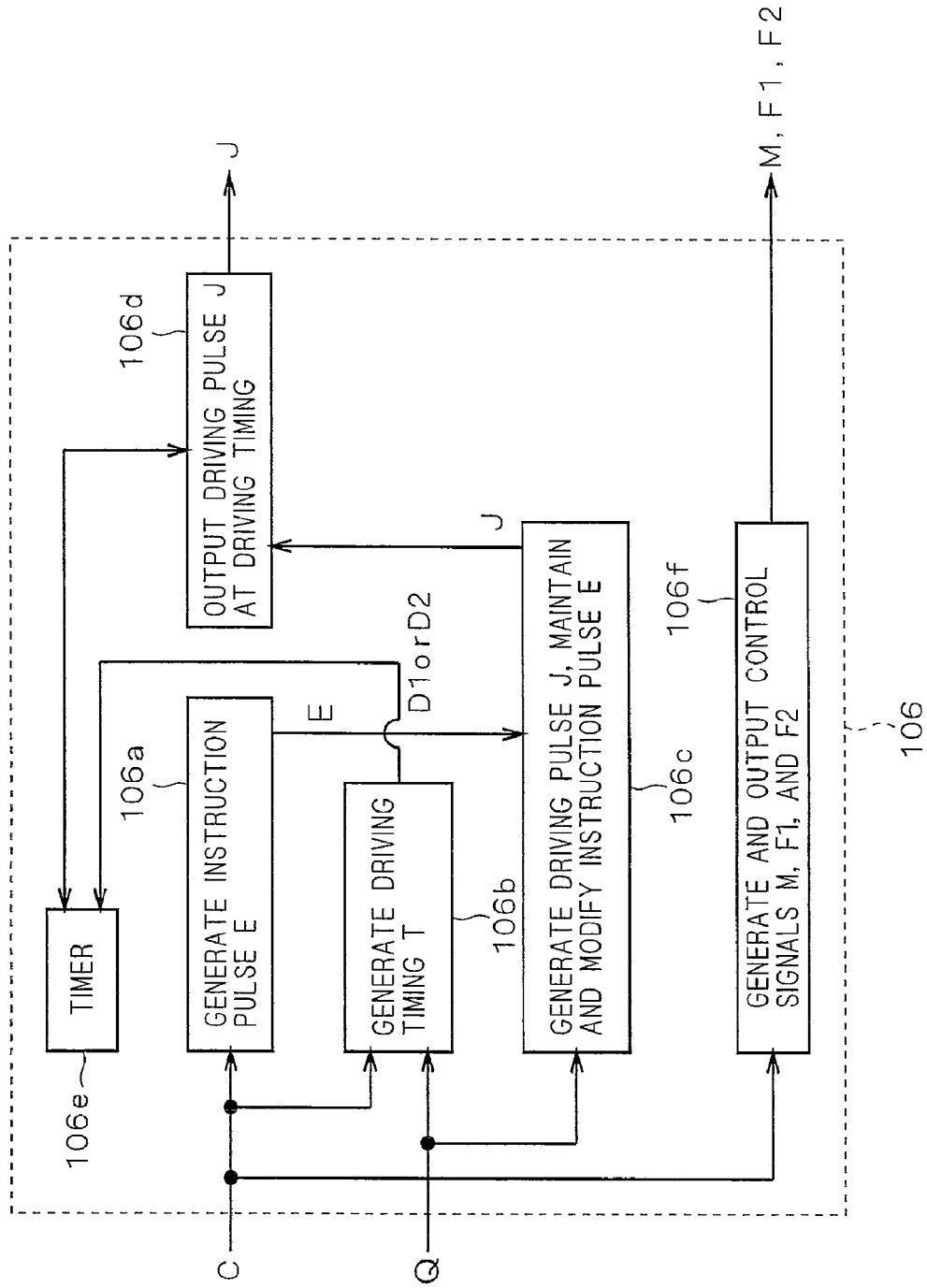
FIG. 3 is a block diagram illustrating functions of a control section by way of blocks.

FIG. 2 is a flowchart illustrating a method of controlling the refrigerant cycle according to the present invention. FIG. 3 is a block diagram illustrating functions of the control section 106 by way of blocks 106a to 106f. The blocks shown in FIG. 3 are not necessarily realized by hardware. The control section 106 is composed of an arithmetic processing unit provided with an interface as required. The functions which correspond to those of the blocks shown in FIG. 3 may be performed in the arithmetic processing unit by a program.

First, it is judged in Step S11 of FIG. 2 whether or not a timing to drive the expansion valve 107 has arrived. In other words, it is judged whether or not an interval which corresponds to a drive timing has passed. This is shown as a function of a timer 106e in FIG. 3. That is, this corresponds to a fact that an output section 106d which outputs the driving pulse J checks the timer 106e whether the drive timing (interval) has passed.

If the judgment of Step S11 is negative, control of the refrigerant cycle returns to a main routine (not shown). For example, in the main routine, drive control of the motors 102, 105, and 204 is executed in response to the control signals M, F1, and F2, respectively.

If the judgment of Step S11 is affirmative, the control of the refrigerant cycle proceeds to Step S19 via Steps S12 through S18, whereby the driving pulse J is output. This corresponds to, in FIG. 3, responding to checking from the block 106d to the timer 106e and permitting or instructing, by the timer 106e, an output of the driving pulse J from the output section 106d (corresponding to an affirmative judgment), or prohibiting or not instructing the output of the driving pulse J (corresponding to a negative judgment). Accordingly, the output section 106d transmits the driving pulse J to the expansion valve 107 at an interval serving as the drive timing.

Next, it is judged in Step S12 whether or not the countermeasure against the generated electrical noise is taken. The process proceeds to Step S13 in the case where the countermeasure is not taken, whereas the process proceeds to Step S14 in the case where the countermeasure is taken. For example, a signal which takes a binary logic is adopted as the second instruction Q, and the binary logic is caused to respond to whether or not the countermeasure against the generated electrical noise is taken.

In Step S13, a first value D1 is adopted as the drive timing to output the driving pulse J. In Step S14, a second value D2 is adopted as the drive timing to output the driving pulse J. Then, the driving pulse J is output at the drive timings at which respective values are adopted (that is, at intervals corresponding to the respective values) after any of Steps S13 and S14 is performed to be output to the expansion valve 107. Although the values D1 and D2 also depend on the first instruction C as described below, the value D2 is larger than the value D1 if there are no fluctuations in the first instruction C.

In FIG. 3, the first instruction C and the second instruction Q are transmitted to an interval generating section 106 which generates the drive timing, and any of the values D1 and D2 is generated as a drive timing T to be transmitted to the timer 106e. After that, the timer 106e times the transmitted drive timing T.

It goes without saying that an interval generating section 106b can adopt the values D1 and D2 generated in advance as the drive timing T, instead of generating the values D1 and D2.

The drive timing T fluctuates in accordance with setting of temperature control indicated by the first instruction C. For example, if a rapid temperature change is set by the first instruction C, a value taken by the drive timing T is small, whereby the expansion valve 107 is frequently driven. In such a case, however, the value D2 in a case where an instruction to take the countermeasure against electrical noise generated is issued by the second instruction Q is larger than the value D1 in a case where the instruction is not issued.

In this manner, an interval at which the expansion valve 107 is driven is increased when the countermeasure against electrical noise is taken. As a result, a flow of the refrigerant is made slow, whereby it is possible to reduce generated electrical noise while performing temperature control based on the first instruction C.

Incidentally, the driving pulse J is generated based on an instruction pulse E and the second instruction Q. Since the instruction pulse E is generated based on the first instruction C, it can also be considered that the driving pulse J is generated based on the first instruction C and the second instruction Q.

More specifically, in a driving instruction amount generating section 106a, the instruction pulse E is generated in accordance with the setting of temperature control, which is indicated by the first instruction C. The instruction pulse E is a target value of the driving pulse J, and becomes the driving pulse J when the countermeasure against electrical noise is not taken. Referring to FIG. 2, the process proceeds to Step S16 after the execution of Step S13, where the instruction pulse E is adopted as the driving pulse J. After Step S16 is performed, the process proceeds to Step S19, and the driving pulse J is transmitted to the expansion valve 107.

However, when the countermeasure against electrical noise is taken, the instruction pulse E is not necessarily adopted directly as the driving pulse J.

First, it is judged in Step S15 whether or not the instruction pulse E exceeds a predetermined value P. In a case where the judgment of Step S15 is negative, the process proceeds to Step S16, and the instruction pulse E is adopted as the driving pulse J. In a case where the judgment of Step S15 is affirmative, the process proceeds to Step S17, and a value smaller than the instruction pulse E is adopted as the driving pulse J. Here, a case where the predetermined value P is adopted a value of the driving pulse J is described as an example.

Referring to FIG. 3, the instruction pulse E and the second instruction Q are input to a driving amount generating section 106c. Then, in a case where the second instruction Q indicates that the countermeasure against electrical noise is taken and the instruction pulse E does not exceed the predetermined value P, the driving amount generating section 106c adopts the instruction pulse E as the driving pulse J and transmits it the driving pulse J to the output section 106. Meanwhile, in a case where the second instruction Q indicates that the countermeasure against electrical noise is taken and the instruction pulse E exceeds the predetermined value P, the driving amount generating section 106c adopts a value smaller than the instruction pulse E as the driving pulse J and transmits it the driving pulse J to the output section 106d.

The driving pulse J transmitted to the output section 106d is transmitted to the expansion valve 107 (Step S19). In this case, the driving pulse J is set to the predetermined value P.

In this manner, when the countermeasure against electrical noise is taken, a driving amount for driving the expansion valve 107 is reduced, with the result that the flow of the refrigerant is made slow. Accordingly, it is possible to reduce generated electrical noise while performing temperature control based on the first instruction C.

Note that in a case where Step S17 is performed, Step S18 is desirably performed. In Step S18, the driving pulse J (in Step S17, the predetermined value P is adopted) is subtracting from the instruction pulse E to modify the instruction pulse E. Then, Step S19 is performed.

The instruction pulse E is modified in this manner, and hence, when the flowchart of FIG. 3 is performed at a following drive timing, it is possible to compensate a driving amount which is insufficient in a value (predetermined value P in the example described above) adopted as the driving pulse J in Step S17 previously.

The instruction pulse E is modified in the driving amount generating section 106c. Note that in a case where Step S17 is not performed but Step S16 is performed, the driving amount generating section 106c maintains the instruction pulse E.

However, Step S18 may be omitted. For example, in a case where Steps S12 to S19 are performed based on the instruction pulse E generated for each drive timing, the above-mentioned omission is possible.

Note that a control signal generating section 106f is also provided in the control section 106. The control signal generating section 106f generates a control signal M based on the first instruction C for controlling an operation of the motor 102 which indirectly controls the compressor 101. In addition, the control signals F1 and F2 for controlling the motors 105 and 204, respectively, are also generated by the control signal generating section 106f. The control signal F2 is provided to the control section 201 and indirectly controls driving of the motor 204 through a process of the control section 201.

While the invention has been shown and described in detail, the foregoing description is in all aspects illustrative and not restrictive. It is therefore understood that numerous modifications and variations can be devised without departing from the scope of the invention.

The invention claimed is:

1. A method of controlling a refrigerant cycle, the refrigerant cycle comprising:

a compressor, a condenser, an expansion valve, and an evaporator through which a refrigerant circulates in the stated order; and a control section which controls, based on a first instruction for setting temperature control, at least an operation of the compressor, and an interval and a driving amount for driving the expansion valve, the method executing the steps of:

(a) obtaining a second instruction for setting whether or not a countermeasure against electrical noise is taken;

(b) adopting, in a case where the second instruction indicates that the countermeasure against electrical noise is not taken, a first value as the interval based on the first instruction;

(c) adopting, in a case where the second instruction indicates that the countermeasure against electrical noise is taken, a second value larger than the first value as the interval; and (d) transmitting, after the steps (b) and (c) are performed, the driving amount to the expansion valve at the interval.

2. The method of controlling a refrigerant cycle according to claim 1, the control section generating an instruction amount serving as a target value of the driving amount, the method further executing, between the step (a) and the step (d), the steps of:

(e) judging, in a case where the second instruction indicates that the countermeasure against electrical noise is taken, whether or not the instruction amount exceeds a predetermined value;

(f) adopting, in a case where the judgment of the step (e) is negative, the instruction amount as the driving amount; and (g) adopting, in a case where the judgment of the step (e) is affirmative, a value smaller than the instruction amount as the driving amount, wherein in the step (d):

electrical noise is not taken, the instruction amount is adopted as the driving amount and the driving amount is transmitted to the expansion valve; and (d-2) in the case where the second instruction indicates that the countermeasure against electrical noise is taken, the driving amount adopted in any one of the steps (f) and (g) is transmitted to the expansion valve.

3. The method of controlling a refrigerant cycle according to claim 2, further executing the step of (h) subtracting the driving amount adopted in the step (g) from the instruction amount and updating the instruction amount, the step being accompanied with the step (g), wherein the steps (a) to (h) are executed again.

4. A refrigerant cycle, comprising:

a compressor, a condenser, an expansion valve, and an evaporator through which a refrigerant circulates in the stated order;

a control signal generating section generating, based on a first instruction for setting temperature control, a control signal for controlling an operation of the compressor;

an interval generating section receiving a second instruction setting whether or not a countermeasure against electrical noise is taken, (i) setting an interval for driving the expansion valve as a first value based on the first instruction in a case where the second instruction indicates that the countermeasure against electrical noise is not taken, and (ii) setting the interval as a second value larger than the first value in a case where the second instruction indicates that the countermeasure against electrical noise is taken; and an output section transmitting, based on the interval, a driving amount for driving the expansion valve based on the first instruction, to the expansion valve.

5. The refrigerant cycle according to claim 4, further comprising:

a driving instruction amount generating section generating, based on the first instruction, an instruction amount serving as a target value of the driving amount; and receiving the instruction amount and the second instruction, (I) adopting the instruction amount as the driving amount and transmits to the output section in the case where the second instruction indicates that the countermeasure against electrical noise is taken and in a case where the instruction amount does not exceed a predetermined value, and (II) adopting a value smaller than the instruction amount as the driving amount and transmits the driving amount to the output section in the case where the second instruction indicates that the countermeasure against electrical noise is taken and in a case where the instruction amount exceeds the predetermined value.

6. The refrigerant cycle according to claim 5, wherein the driving amount generating section (III) adopts the instruction amount as the driving amount and transmits the driving amount to the output section in the case where the second instruction indicates that the countermeasure against electrical noise is not taken.

* * * * *